United States Patent [19]

Chikano

[11] Patent Number: 4,468,102
[45] Date of Patent: Aug. 28, 1984

[54] LENS SHADE

[75] Inventor: Mitsuo Chikano, Fussa, Japan

[73] Assignee: Hoya Corporation, Tokyo, Japan

[21] Appl. No.: 349,206

[22] Filed: Feb. 17, 1982

[51] Int. Cl.³ .......................... G02B 7/00; G03B 11/04
[52] U.S. Cl. .................................................... 350/581
[58] Field of Search .............................. 350/580–581, 350/250; 354/287

[56] References Cited

U.S. PATENT DOCUMENTS

| | | | |
|---|---|---|---|
| 2,350,110 | 5/1944 | Hood | 350/581 |
| 2,352,844 | 7/1944 | Loebe | 350/580 |
| 3,379,485 | 4/1968 | Steisslinger | 350/580 |
| 4,390,242 | 6/1983 | Tatsumi | 350/318 |

FOREIGN PATENT DOCUMENTS 501710  3/1939  United Kingdom ................ 350/580

*Primary Examiner*—William H. Punter

[57] ABSTRACT

A camera lens shade made of a flexible material and having the shape approximately of a hollow cylinder. One open end of the lens shade faces the object to be photographed, while the other open end thereof has means for engagement with a shade support which, in turn, is adapted to engage with a camera, an interchangeable lens or a filter holder. The cylindrical part of the lens shade has a plurality of annular thin hinge sections at any of which the cylindrical portion can be folded. The cylindrical part can be folded at any or all of the hinge sections according to the focal length and the angle of view of the camera lens system used, so as to prevent unwanted light from entering the camera.

4 Claims, 10 Drawing Figures

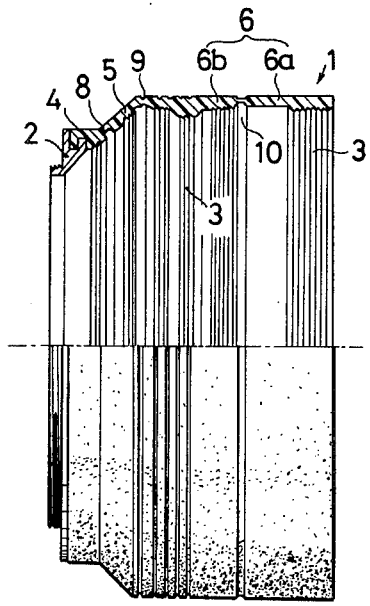
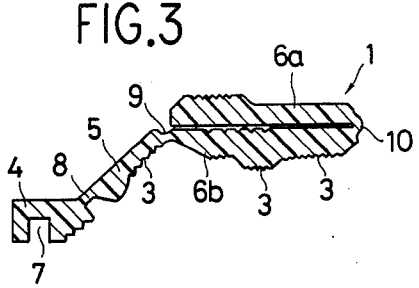
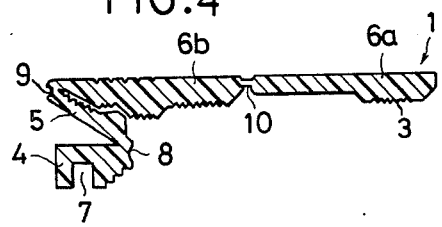
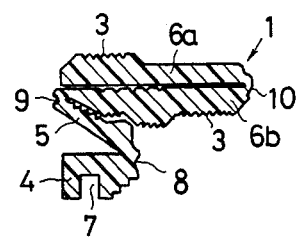
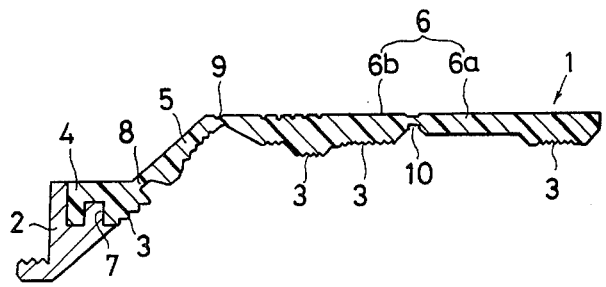

LENS SHADE

BACKGROUND OF THE INVENTION

1. Field of the Invention

The present invention relates to a camera lens shade of a flexible material, the cylindrical portion of which can be folded back according to the focal length and the angle of view of the camera lens system used.

2. Description of the Prior Art

At present, camera attachments, such as lens shades and filters, which are attached to the front of the camera lens body tube, generally have large apertures because lenses having large diameters are often used. Therefore, lens shades of rubber are used which maintain their normal shapes during use and can be folded up like bellows for easy storage. However, such lens shades of rubber cannot be adjusted according to the change of the angle of incidence or the angle of view.

A lens shade disclosed in Japanese Utility Model Laid-Open Publication No. Sho 50-74932 comprises a main part of a hard material and a cylindrical section of a flexible material continuously connected to one end of said main part, said cylindrical section being adapted to be folded back toward the inside according to the focal length and the angle of view. However, this lens shade cannot be reduced compactly, or folded in different manners so as to adapt itself to widely different angles of view.

BRIEF SUMMARY OF INVENTION

It is an object of the invention to provide a lens shade, the flexible cylindrical part of which can be folded back according to the focal length and the angle of view of the camera lens system used.

It is another object of the invention to provide a lens shade which can be reduced in size for easy carriage and storage.

A lens shade of the invention is made entirely of a flexible material such as synthetic rubber or plastic, and has the overall shape approximately of a hollow cylinder, one open end thereof facing the object to be photographed, the other open end thereof being provided with an annular base part having means for engagement with a shade support which, in turn, is adapted to engage with a camera, an interchangeable lens or a filter holder, the cylindrical portion of the lens shade having a plurality of annular thin hinge sections at any of which the cylindrical portion can be folded. When put to use, the cylindrical portion is folded at any or all of said annular thin hinge sections according to the focal length and the angle of view of the camera lens system used, so as to prevent unwanted light from entering the camera.

In embodying the invention, a conical part is continuously connected to one end of a cylindrical main part, and the annular base part engaging with the shade support is continuously connected to the smaller end of the conical part. A bending (folding) point between the base part and the conical part, a bending point between the conical part and the cylindrical main part, and the approximately central section of the cylindrical main part, respectively, are formed as annular thin hinge sections, at any of which the cylindrical main part or the conical port can be folded so as to reduce the overall size of the lens shade or to permit a desired focal length and a desired angle of view.

Thus, the lens shade of the invention is very suitable for cameras and interchangeable lenses. It is made entirely of a flexible material such as synthetic rubber or plastic, and can be reduced in size for easy carriage and storage. The lens shade comprises the annular base part, the conical part and the cylindrical main part, both ends of the conical part and the approximately central section of the cylindrical main part, respectively, forming hinge sections. By folding the main part or the conical part in any of a plurality of different manners by utilizing all or any of the hinge sections, the lens shade can be easily adapted to the change of the angle of view. Furthermore, the lens shade can be easily attached to the lens body tube of the camera, interchangeable lens, etc., because the base part is provided with the means for engagement with the shade support. Also, the lens shade is inexpensive to manufacture because its base part, conical part and cylindrical main part can be integrally formed by injection molding, or the like.

BRIEF DESCRIPTION OF THE DRAWINGS

The invention will be further described in detail with reference to the accompanying drawings, in which:

FIG. 1 is a half sectional side view of a lens shade according to an embodiment of the invention;

FIG. 2 is an enlarged sectional view of the same;

FIGS. 3 to 5 are enlarged sectional views of the lens shade folded in different manners according to the angle of view of the camera lens system used;

DESCRIPTION OF THE PREFERRED EMBODIMENTS

Figure 6:
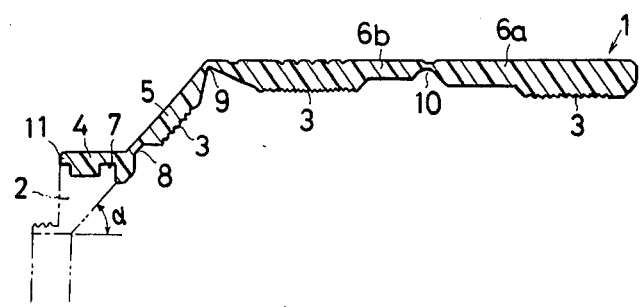
FIG. 6 is a sectional view showing another embodiment of the invention.

Referring to FIG. 1, a lens shade 1 is made of a flexible material such as synthetic rubber or plastic, and one end thereof has a means for engagement with an adapter ring 2 which is secured to the body tube of a camera or of an interchangeable lens. The lens shade 1 is provided on its inner surface with light intercepting means 3 consisting of annular grooves.

The lens shade 1 comprises an annular base part 4, a conical part 5 continuously connected to one end of the base part 4, and a cylindrical main part 6 continuously connected to the larger end of the conical part 5. The base part 4 is provided on the inside with a means 7 FIG. 2 for engagement with the flange of the adapter ring 2. A bending point between the base part 4 and the conical part 5 is formed as the first annular thin hinge section 8. A bending point between the conical part 5 and the main part 6 is formed as a second annular thin hinge section 9. The approximately central section of the main part 6 forms a third annular thin hinge section 10 which divides the main part 6 into a front portion 6a and a rear portion 6b.

To use the lens shade 1, the adapter ring 2 suitable for the body tube of the camera or of the interchangeable lens is engaged with the engagement means 7 of the base part 4 as shown in FIG. 1. This is accomplished by widening (stretching) the base part 4 of the flexible lens shade 1 and elastically engaging the flange of the adapter ring 2 with the engagement means 7 on the inside of the base part 4. During the use of the lens shade 1 said light intercepting means 3 formed on the inner surface thereof prevents unwanted light from reaching the film. Needless to say, the adapter ring 2 shown in FIG. 1 is merely an example and is not limited to the specific shape shown therein.

FIG. 2 is an enlarged sectional view showing the lens shade 1 in a normal state where it is not folded at any of said hinge sections. The lens shade 1 in this state is used, for instance, for a lens having a long focal length. FIGS. 3 to 5 show the lens shade 1 in folded states, respectively, used for a standard lens, a wide-angle lens and a superwide-angle lens. In FIG. 3, the front main portion 6a is folded back toward the outside at the third hinge section 10 so as to reduce the overall length of the lens shade 1 and permit a wider angle of view. In FIG. 4 the conical part 5 is folded back at the first hinge section 8 and the main part 6 is folded at the second hinge section 9 toward the conical part 5 so as to permit a still wider angle of view. If, as shown in FIG. 5 the front main portion 6a is folded back toward the outside at the third hinge section 10 in addition to the state shown in FIG. 4, the lens shade 1 becomes the shortest in overall length and therefore permits the widest angle of view. When the lens shade 1 is folded up as shown in FIG. 5, it is compact and can be easily carried and stored. In the embodiment shown in FIG. 1, the lens shade 1 has three hinge sections, two at the ends of the conical part 5 and one at the center of the main part 6, so that it can be folded in three different manners and permit four different angles of view. However, the lens shade 1 may have more than three hinge sections so that it can be folded in more than three different manners and permit more than four different angles of view.

FIG. 6 shows another embodiment of the invention. In this embodiment, the inclination α of the conical part 5 is slightly greater than that in the embodiment shown in FIG. 1, and the annular base part 4 is provided with a lip 11 which covers the outer circumference of the adapter ring 2 as well as with the means 7 for engagement with the adapter ring 2. In this embodiment, the lens shade 1 permits a wider angle of view than in the above-mentioned embodiment when it is folded up as shown in FIG. 5. The light intercepting means 3 of the rear main portion 6b and the light intercepting means 3 of the conical part 5 are respectively formed at the same diameter and are made simpler in shape than in the above-mentioned embodiment so as to facilitate manufacturing.

Figure 7:
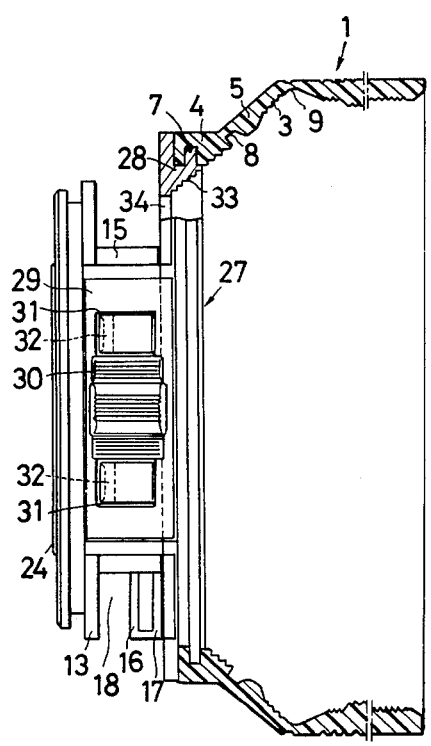
FIG. 7 is a side view showing a further embodiment of the invention, in which the lens shade is attached to a filter holder.
Figure 8:
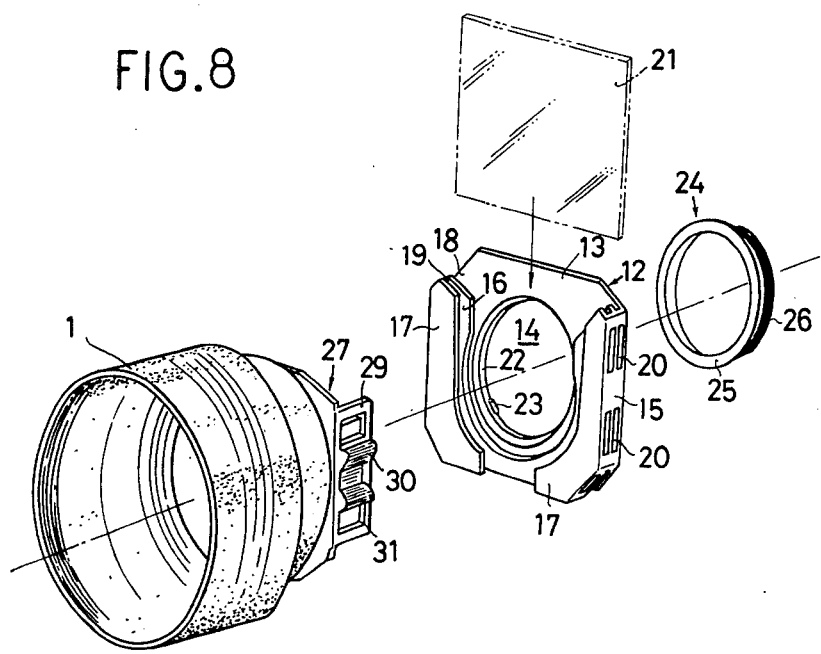
FIG. 8 is an exploded view in perspective of said embodiment in FIG. 7.

FIG. 7 shows a further embodiment of the invention, in which the lens shade 1 is detachably attached to the front of a filter holder 12 for the camera. This filter holder 12, shown in FIG. 8, is disclosed in U.S. patent application Ser. No. 243,211, filed Mar. 12, 1981, now issued as U.S. Pat. No. 4,390,242, to K. Tatsumi, and comprises a body 13 having the shape of a square with its corners bevelled, said body 13 being provided in its center with a circular aperture 14 and on its front face with right and left side walls 15 from each of which a first plate 16 and a second plate 17 extend inwardly. The opening between the body 13 and the first plate 16 serves as a first groove 18 for receiving a filter or a filter mount 21, while the opening between the first and second plates 16 and 17 serves as a second groove 19 for receiving the same. Each of said side walls 15 has two upper and two lower concave portions 20. The bottom of each of these concave portions 20 is provided with a spring member (not shown) for pressing against the edge of the filter or filter mount 21 inserted into the first groove 18 or the second groove 19. The body 13 is provided at its back with an annular groove 22 having a plurality of claws 23 for engagement with the flange 25 of an adapter ring 24. The adapter ring 24 has a threaded portion 26 by means of which it is secured to the camera.

Figure 9:
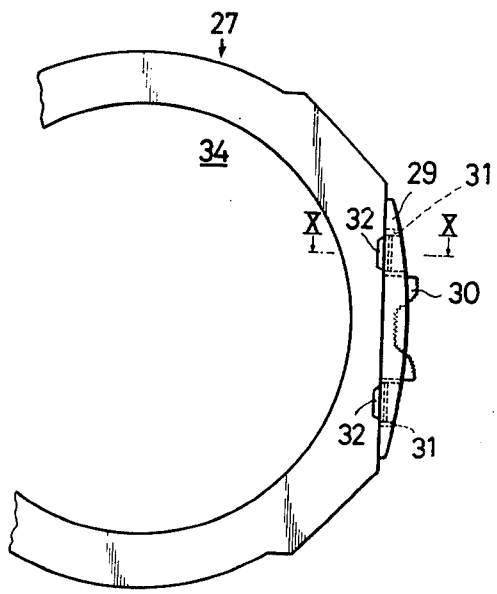
FIG. 9 is a front view of a shade support in FIG. 7.
Figure 10:
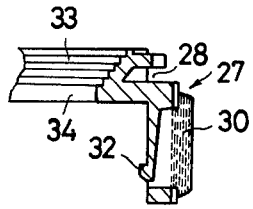
FIG. 10 is a sectional view taken on line X—X of FIG. 9.

The main body of the lens shade 1 attached to the front of said filter holder 12 is the same as shown in FIG. 1, but a shade support 27, a member for supporting the lens shade 1, has elaborate means for engagement with the filter holder 12. As shown in FIGS. 9–10, the body of the shade support 27 is provided in its center with a circular aperture 34, and on its circumference with an annular groove 28 defined by two flanges for engagement with the base part 4 of the lens shade 1. Furthermore, the body of the shade support 27 is integrally provided on its right and left sides with side walls 29, FIGS. 7-8. Each of the side walls 29 has a knurled knob 30 in the center, openings 31 over and under the knob 30, and engagement pieces 32 each extending from one side of each opening 31 toward the other side thereof. These engagement pieces 32 are engaged with the concave portions 20 in the side walls 15 of the filter holder 12 so as to connect the shade support 27 with the filter holder 12. As shown in FIGS. 7 and 10, the body of the shade support 27 is provided on its inner surface with light intercepting means 33 continuing to said light intercepting means 3 of the lens shade 1.

Different kinds of filters or filters mounts 21 are inserted into the grooves 18 and 19 of said filter holder 12. The filter holder 12 is very convenient for use because it is rotatable with respect to the adapter ring 24. The lens shade of this embodiment can be easily attached to and detached from the filter holder 12. The attachment of the lens shade thereto does not impair the function of the filter holder 12.

As many apparently widely different embodiments of this invention may be made without departing from the spirit and scope thereof, it is to be understood that the invention is not limited to the specific embodiments thereof except as defined in the appended claims.

What is claimed is:

1. A camera lens shade (1) of a flexible material, comprising a conical part (5) and a cylindrical main part (6) continuously connected to the larger end of said conical part (5), said conical part (5) being provided at its smaller end with a base part (4) having means (7) for engagement with a shade support, first and second annular hinge sections (8) and (9) joining parts (4) and (5), and parts (5) and (6) respectively, and a third annular hinge section (10) being provided at the approximately central portion of said cylindrical main part (6), said third annular hinge section (10) dividing said main part into front and rear main portions (6a) (6b), whereby said conical part (5) is foldable at said first hinge section (8) onto said base part (4), said rear main portion (6b) is foldable at said second hinge means (9) onto said conical part (5) and said front main portion (6a) is foldable back toward the outside at said third hinge section (10) onto said rear main portion (6b), so as to change the length of the lens shade according to the focal length and the angle of view of the camera lens system with which the lens shade is used.

2. A camera lens shade as claimed in claim 1, wherein said shade support is an adapter ring directly attachable to the body tube of a lens.

3. A camera lens shade as claimed in claim 1, wherein said shade support has engagement pieces adapted to engage with concave portions in the side walls of a filter holder attached to the front of the body tube of a lens.

4. A camera lens shade as claimed in claim 1, wherein said base part is annular and said hinge means are formed as annular thin hinge sections at which the lens shade can be folded, said conical part and cylindrical main part being provided on their inner surfaces with light intercepting means.

* * * * *